United States Patent [19]

Albanese

[11] Patent Number: 5,749,325
[45] Date of Patent: May 12, 1998

[54] MULTI-PURPOSE STRAP FOR PETS

[76] Inventor: Guido Albanese, 23 Rockview Gardens, Concord, Ontario, Canada, L4K 2J5

[21] Appl. No.: 640,574

[22] Filed: May 1, 1996

[51] Int. Cl.⁶ .................. A01K 1/06; A01K 1/04
[52] U.S. Cl. .................. 119/792; 24/371; 24/458; 119/795; 119/797
[58] Field of Search .................. 119/770, 769, 119/786, 787, 788, 790, 791, 792, 793, 795, 797, 799; 24/458, 533, 563, 571, 271, 265 H

[56] References Cited

U.S. PATENT DOCUMENTS

| | | | |
|---|---|---|---|
| 153,724 | 8/1874 | Schmidt | 119/795 |
| 1,120,041 | 12/1914 | Dunn | 119/790 |
| 2,006,014 | 6/1935 | Doyle | 24/371 |
| 2,224,972 | 12/1940 | Long, Jr. et al. | 24/265 H |
| 2,827,017 | 3/1958 | Ryan | 119/795 |
| 2,931,085 | 4/1960 | Benlian | 24/265 H |
| 3,079,657 | 3/1963 | Russell | 24/265 H |
| 3,752,127 | 8/1973 | Baker | 119/797 |
| 4,221,039 | 9/1980 | Smith | 24/458 |
| 5,005,527 | 4/1991 | Hatfield | 119/793 |
| 5,427,061 | 6/1995 | McCullough | 119/792 |
| 5,443,037 | 8/1995 | Salame | 119/792 |
| 5,456,213 | 10/1995 | Beauchamp | 119/795 |

FOREIGN PATENT DOCUMENTS

| | | | |
|---|---|---|---|
| 634446 | 3/1950 | United Kingdom | 119/795 |
| 2039705 | 8/1980 | United Kingdom | 119/795 |

*Primary Examiner*—Paul J. Hirsch
*Attorney, Agent, or Firm*—David W. Wong

[57] ABSTRACT

A multi-purpose restraining strap is operative both as a general purpose leash and a washing restraint for pets. The strap is made of a weather-proof and washable synthetic plastic web or cord having a releasable buckle at one end for forming a loop which may be noosed over the neck of the pet as a collar. A quick release latch hook is provided at the other end of the strap for securing the strap to another object or a support. A generally inverted V-shaped bracket is provided, which may be removably attached to the quick release latch hook and to the drain of a bath tub such that the strap may serve as a restraint to confine the pet within a bath tub for washing purposes.

6 Claims, 2 Drawing Sheets

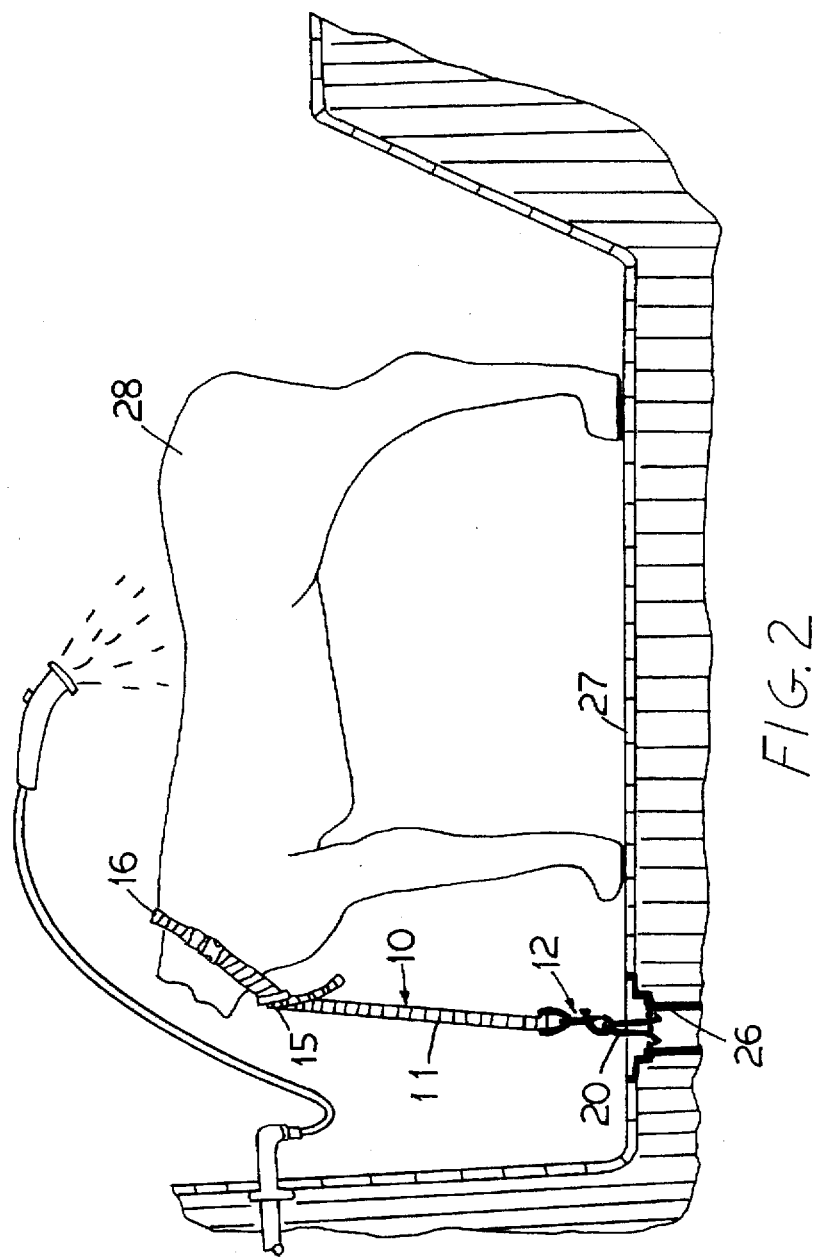

MULTI-PURPOSE STRAP FOR PETS

BACKGROUND OF THE INVENTION

This invention relates to a multi-purpose strap and more particularly relates to a strap which may be used as a general purpose leash as well as a restraint for confining a pet within a bath tub for washing purposes.

In bathing or washing of a pet it is often rather difficult to restrain the pet such that it may be washed properly. Numerous washing devices have been designed for carrying out such task such as that shown in U.S. Pat. No. 5,243,931 to Richard W. McDonaugh, which, among other things, consists generally of a basin equipped with a plurality of restraining belts provided therein for tying the pet within the basin so that the pet may be washed. Such pet washing devices are complex in structure and are costly to fabricate. Furthermore, it is difficult to operate since it is an infeasible task to locate the pet within the basin and additionally having to maintain the frisky pet within the basin while manipulating the plurality of restraining belts so as to secure the pet therewithin properly.

SUMMARY OF THE INVENTION

It is a principal object of present invention to provide a restraining strap for securing a pet within a bath tub for washing purposes.

It is another object of the present invention to provide a strap which may be used as a washing restraint as well as a general purpose leash.

It is another object of the present invention to provide a multi-purpose strap which is adaptable for use with pet of various sizes.

It is yet another object to the present invention to provide a multi-purpose strap which is weather-proof and washable.

It is still another object of the present invention to provide a multi-purpose strap which is simple in structure and easy to operate.

Briefly, the multi-purpose strap comprises an elongated synthetic web having a snap buckle provided at one end portion therein. The snap buckle is operative to engage with an associated buckle adjustably disposed in this one end portion such that a loop is formed therein to serve as a collar for a pet. The location of the associated buckle may be adjusted to vary the size of the loop so as to accommodate pets of various sizes. A quick release latch hook is provided at the free end of the web for mounting the strap to any convenient support or to another object. A generally inverted V-shaped spring bracket is removably secured to the quick release latch hook. The bracket has two hook shaped legs operative to engage removably with a drain of a bath tub to secure the pet quickly within a bath tub for washing purposes.

BRIEF DESCRIPTION OF THE DRAWINGS

Other objects and advantages of the present invention will become apparent from the following detailed description of the preferred embodiments thereof in connection with the accompanying drawings, in which

FIG. 2 is a partial cross sectional side elevation perspective view showing the multi-purpose strap of the present invention for restraining a pet within a bath tub for washing.

DETAILED DESCRIPTION OF THE PREFERRED EMBODIMENTS

Figure 1:
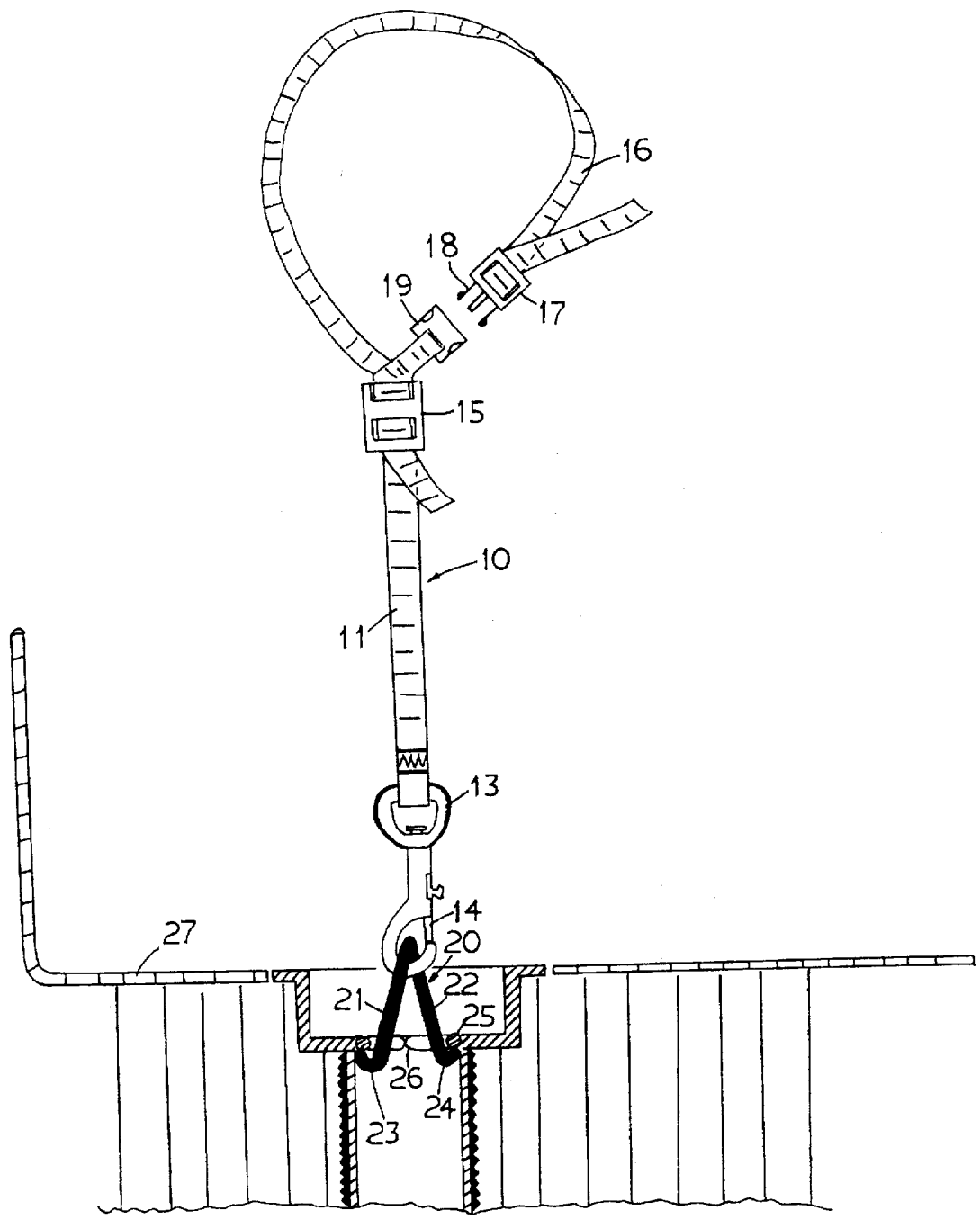
FIG. 1 is expanded perspective overall elevation view of the multi-purpose strap of the present invention with the inverted V-shaped bracket removably secured to the drain of a bath tub.

With reference to the drawings wherein like reference numerals designate the same parts in the various views, the strap 10 of the present invention is made of an elongated weather-proof and washable strong and flexible synthetic plastic web or cord 11. A quick release latch hook 12 is provided at one end of the web or cord 11. The latch hook 12 includes a swivel ring 13 mounted to the end of the web or cord 11 and a spring-biassed latch 14 which may be operative to secure to any convenient support or another object. A slip buckle 15 is slidably mounted to the other end of the web or cord 11. The position of the slip buckle 15 may be quickly and easily adjusted by slidably adjusting the length of the end portion of the web or cord 11 engaging with the slip buckle 15. A relatively short length of collar web or cord 16 is fixedly mounted to the slip buckle 15. A snap buckle 17 is provided at one end of the collar web or cord 16 which slidably engages with two slots provided in the collar buckle such that the position of the snap buckle 17 may be quickly and easily varied by varying the length of the end portion of the collar web or cord 16 extending beyond the snap buckle 17. The snap buckle 17 also has spring fingers 18 which are operative to engage releasably in a snap action with an associated buckle 19 mounted at the other end of the collar web or cord 16 so as to form a loop for noosing around the neck of the pet. The length of the end portion of the collar web or cord 16 extending from the slip buckle 15 to the associated buckle 19 is fixed such that the size of the loop may be varied by adjusting the position of the snap buckle 17 in order to accommodate pets of various sizes. The strap 10 is therefore, conveniently useable as a general purpose leash for the pet and its length may be easily varied by adjusting the length of the end portion engaging with the slip buckle 15.

An inverted V-shaped spring bracket 20 is provided with the belt 10. The bracket 20 is preferably made of a water proof material and spring action material such as stainless steel and it has two leg portions 21 and 22. The free end of the leg portion 21 has a hook-shaped end 23 and the free end of the leg portion 22 also has a hook-shaped end 24. The hook-shaped ends 23 and 24 are releasably engageable with rim and grill portion 25 the drain 26 of a conventional bath tub 27 as best shown FIG. 1 so as to secure the strap 10 to the bath tub 27.

When it is necessary to wash the pet 28, the strap 10 is simply attached to the pet with the inverted V-shaped bracket 21 secured to the quick release latch hook 12. The pet 28 is then led or placed into the bath tub 27 and the inverted V-shaped bracket 21 is inserted with its hook-shaped ends 23 and 24 of its leg portions 21 and 23 engage in a snap action with the rim and grill 25 of the drain 26 of the bath tub 27. The length of the strap 10 may then be quickly and simply adjusted by adjusting its end portion engaging with the slip buckle 15 so as to restrain the pet comfortably and suitably within the bath tub 27 for washing.

While the preferred embodiments of the invention have been described above. It will be recognited and understood that various modifications may be made therein without departing from the spirit or essential attributes thereof, and it is desired therefore that only such limitations be placed thereon as are imposed by the appended claims.

What I claim is:

1. A multi-purpose strap comprising
    an elongated web member made of a strong flexible and washable material, a releasable latch member mounted at one end of said web member, a slip buckle member mounted at a second end of said web member, the position of said slip buckle member on said web member being variable by adjusting the length of said second end of said web member extending beyond said slip buckle member, a collar web member secured to said slip buckle member, a quick release snap buckle member adjustably mounted at one end portion of said collar web member, an associated buckle member mounted at a second end of said collar web member, said quick release snap buckle member being operative to engage with said associated buckle member to form a loop for being worn over the neck portion of a pet, a spring bracket member removably attached to said releasable latch member and being operative to engage releasably with a drain opening of a bath tub.

2. A multi-purpose strap according to claim 1 wherein said quick release snap buckle member includes spring action fingers operative to engage releasably with said associated buckle member.

3. A multi-purpose strap according to claim 2 wherein said spring bracket member is an inverted V-shaped spring having leg portions releasably engageable with the drain opening of said bath tub for removably securing said belt thereto.

4. A multi-purpose strap according to claim 3 wherein said leg portions of said inverted V-shaped spring include a hook-shaped end operative to engage the drain opening of said bath tub.

5. A multi-purpose strap according to claim 4 wherein said releasable latch member includes a spring biassed latch operative to engage with said inverted V-shaped spring.

6. A multi-purpose strap according to claim 5 wherein said releasable latch member includes a swivel ring mounted between said latch member and said web member.

* * * * *